(12) United States Patent
Chen

(10) Patent No.: US 10,842,269 B2
(45) Date of Patent: Nov. 24, 2020

(54) ELECTRIC SOFA POWER SUPPLY SYSTEM

(71) Applicant: MOTECK ELECTRIC CORP., New Taipei (TW)

(72) Inventor: Cheng-Chih Chen, New Taipei (TW)

(73) Assignee: MOTECK ELECTRIC CORP., New Taipei (TW)

( * ) Notice: Subject to any disclaimer, the term of this patent is extended or adjusted under 35 U.S.C. 154(b) by 0 days.

(21) Appl. No.: 16/579,504

(22) Filed: Sep. 23, 2019

(65) Prior Publication Data
US 2020/0146451 A1    May 14, 2020

(30) Foreign Application Priority Data
Nov. 14, 2018    (TW) .............................. 107215470 U

(51) Int. Cl.
*A47B 97/00* (2006.01)
*A47C 1/02* (2006.01)
*H02J 7/00* (2006.01)

(52) U.S. Cl.
CPC ................ *A47B 97/00* (2013.01); *A47C 1/02* (2013.01); *H02J 7/00* (2013.01)

(58) Field of Classification Search
CPC ............... A47B 97/00; A47C 1/02; H02J 7/00
See application file for complete search history.

(56) References Cited

U.S. PATENT DOCUMENTS

| 2019/0064900 A1* | 2/2019 | Lee ........................ G06F 1/266 |
| 2019/0328141 A1* | 10/2019 | Cheng ..................... H02J 50/12 |

* cited by examiner

*Primary Examiner* — Robert L Deberadinis
(74) *Attorney, Agent, or Firm* — Muncy, Geissler, Olds & Lowe, P.C.

(57) ABSTRACT

An electric sofa power supply system includes a power supply unit, a USB female connector having a trigger signal. When the trigger signal pin of the USB female connector is electrically connected with a mating USB male connector of an external electric device, the control unit controls the power supply unit to provide power to the USB female connector. When the USB female connector is electrically disconnected from the mating USB male connector of the external electric device, the control unit cuts off the power supply of the power supply unit to the USB female connector, achieving zero power consumption, energy saving and environmental protection, and enhancing the safety of using the power supply system. The electric sofa power supply system does not need to add a switch to the electric sofa to control the power supply of the USB female connector, which greatly increases the aesthetics and practicability.

6 Claims, 6 Drawing Sheets

ELECTRIC SOFA POWER SUPPLY SYSTEM

This application claims the priority benefit of Taiwan patent application number 107215470, filed on Nov. 14, 2018.

BACKGROUND OF THE INVENTION

1. Field of the Invention

The present invention relates to power supply technology and more particularly, to a power supply system for electric sofa, which has a trigger signal pin disposed in a USB female connector that is disposed on a surface of the sofa, and a control unit controls a power supply unit to provide a power supply to the USB female connector when a mating USB connector of an external electronic device is connected to the USB female connector, or to cut off the power supply when the mating USB connector of the external electronic device is disconnected from the USB female connector.

2. Description of the Related Art

Electric sofas are nowadays popular furniture, which can be adjusted to change the inclined angle according to different needs of users. The adjustment of the inclined angle is achieved by the operation of an actuator that is disposed in the electric sofa. A higher-end electric sofa model also has a USB female connector for powering handheld electronic device (such as smart phone or tablet computer) for audio, entertainment, and communication applications to provide economical home rest and pressure relief functions.

The power supply mode of the USB female connector of the above-mentioned high-end electric sofa model is that the USB female connector maintains a basic standby current for detection regardless of whether an electronic device is inserted or not. However, the prior art uses a microprocessor to detect changes in the characteristics of the electrical connection so as to distinguish whether or not an electronic device is inserted, thereby reducing standby power consumption. The standby power consumption is usually maintained at about 0.5 W (watts), but for the pursuit of energy saving and carbon reduction today, the long-term accumulation of standby power consumption also consumes a lot of power and is not environmentally friendly.

Another method is to set a switch on the body of the electric sofa, and the user can press the switch to turn on or off the power supply of the USB female connector. However, the setting of the switch on the electric sofa will destroy the overall texture, and it is not intuitive enough to be used, and it cannot be "plug and play". If the switch is set in an inconspicuous position, the user may not find the switch and cannot supply power to the handheld electronic device. Instead, the thankfulness of the design of the USB female connector for the electric sofa was lost. Therefore, the aforementioned problems have yet to be improved by those in this industry.

SUMMARY OF THE INVENTION

The present invention has been accomplished under the circumstances in view. It is one object of the present invention to provide an electric sofa power supply system, which comprises a power supply unit, a USB female connector having a trigger signal, and a control unit electrically connected with the power supply unit and the USB female connector. When the trigger signal pin of the USB female connector is electrically connected with a mating USB male connector of an external electric device, the control unit controls the power supply unit to provide power to the USB female connector. When the USB female connector is electrically disconnected from the mating USB male connector of the external electric device, the control unit cuts off the power supply of the power supply unit to the USB female connector, achieving zero power consumption, energy saving and environmental protection, and enhancing the safety of using the power supply system. Further, the use of the electric sofa power supply system does not need to add a switch to the electric sofa to control the power supply of the USB female connector, which greatly increases the aesthetics and practicability.

It is another object of the present invention to provide an electric sofa power supply system, wherein when the curved mating connection portion of the trigger signal pin of the USB female connector is electrically connected to an inner side in a housing of the USB male connector of the external electronic device, the control unit detects that the USB male connector of the external electronic device is inserted and electrically connected to the trigger signal pin, and then controls the power supply unit to provide the power supply to the USB female connector.

It is still another object of the present invention to provide an electric sofa power supply system, wherein the USB female connector comprises four signal pins, the aforesaid trigger signal pin, a frame and a tongue plate. The tongue plate defines a first surface and an opposing second surface. The signal pins each comprise a curved mating connection portion respectively disposed on the first surface of the tongue plate. The curved mating connection portion of the trigger signal pin is disposed on the second surface of the tongue plate. The frame surrounds the signal pins, the trigger signal pin and the tongue plate.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
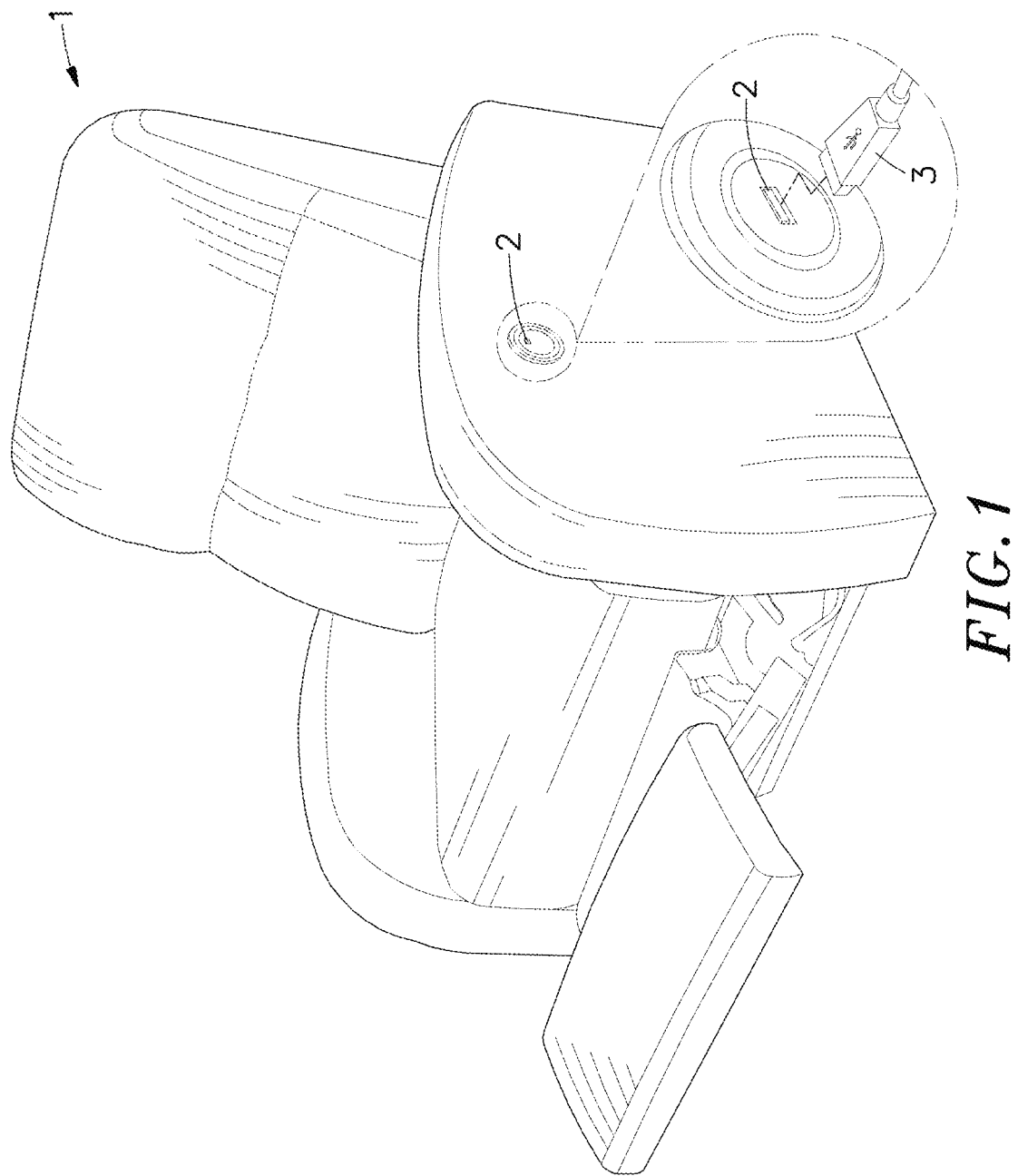
FIG. 1 is an oblique top elevational view of an electric sofa using a power supply system in accordance with the present invention.
Figure 2:
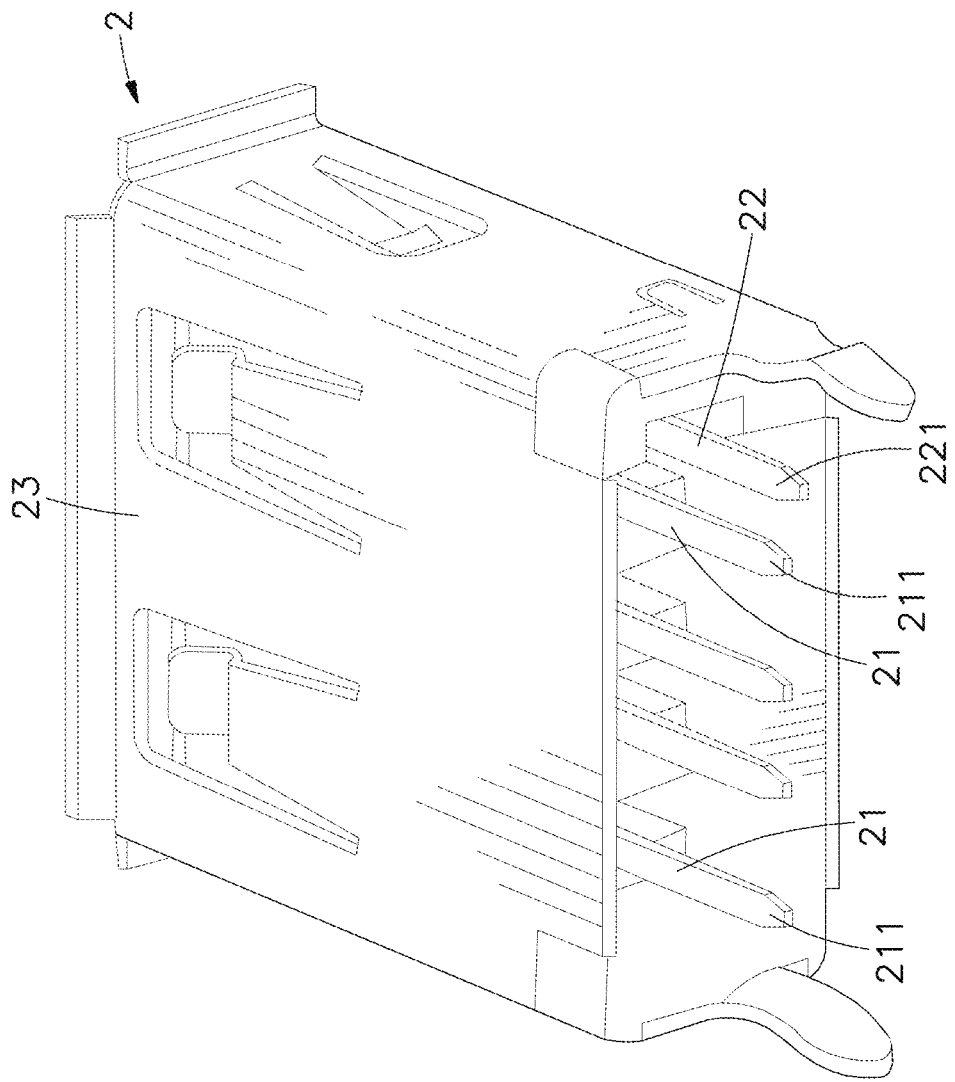
FIG. 2 is an elevational side view of the USB female connector of the power supply system in accordance with the present invention.
Figure 3:
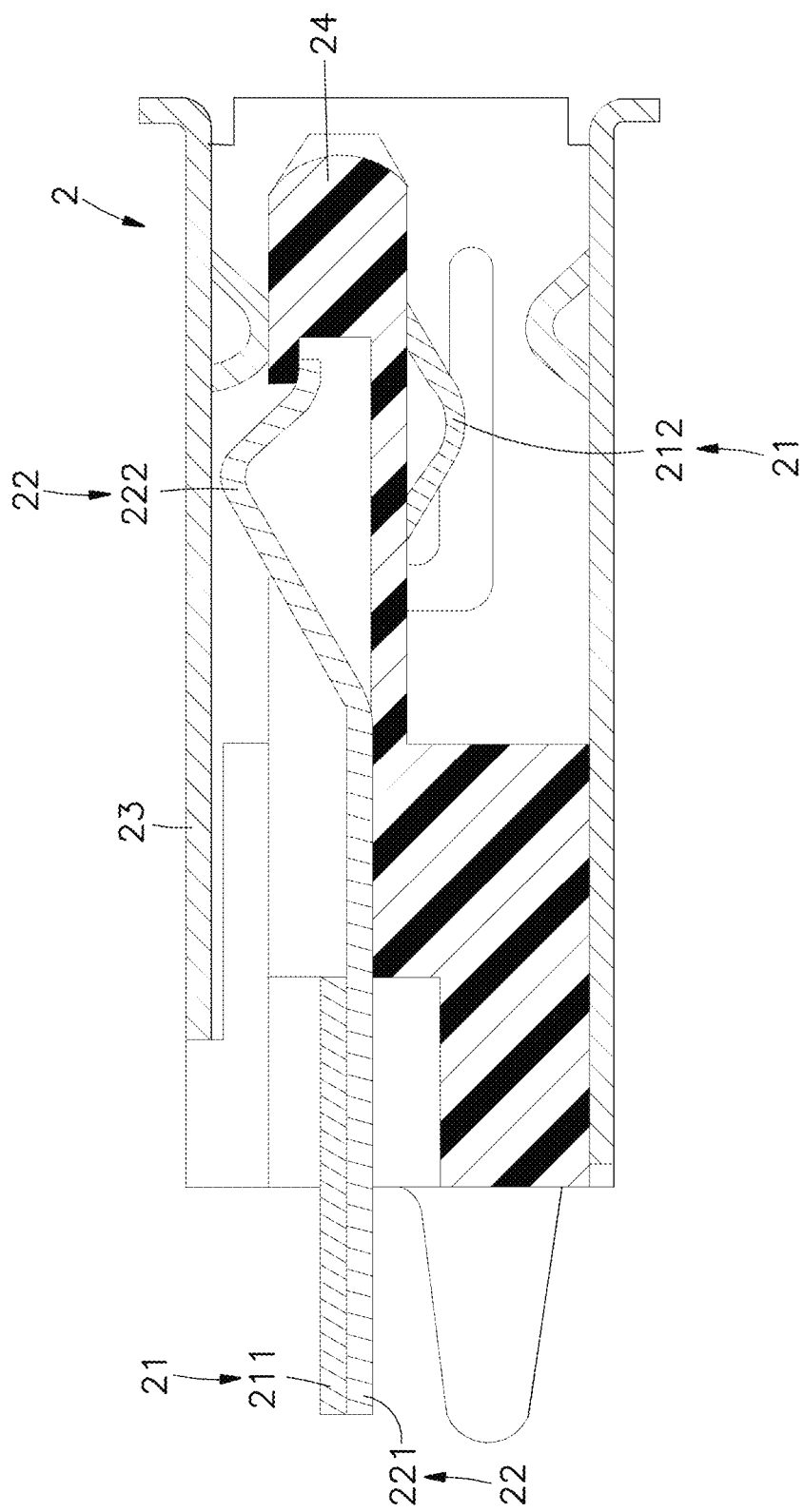
FIG. 3 is a sectional side view of the USB female connector.
Figure 4:
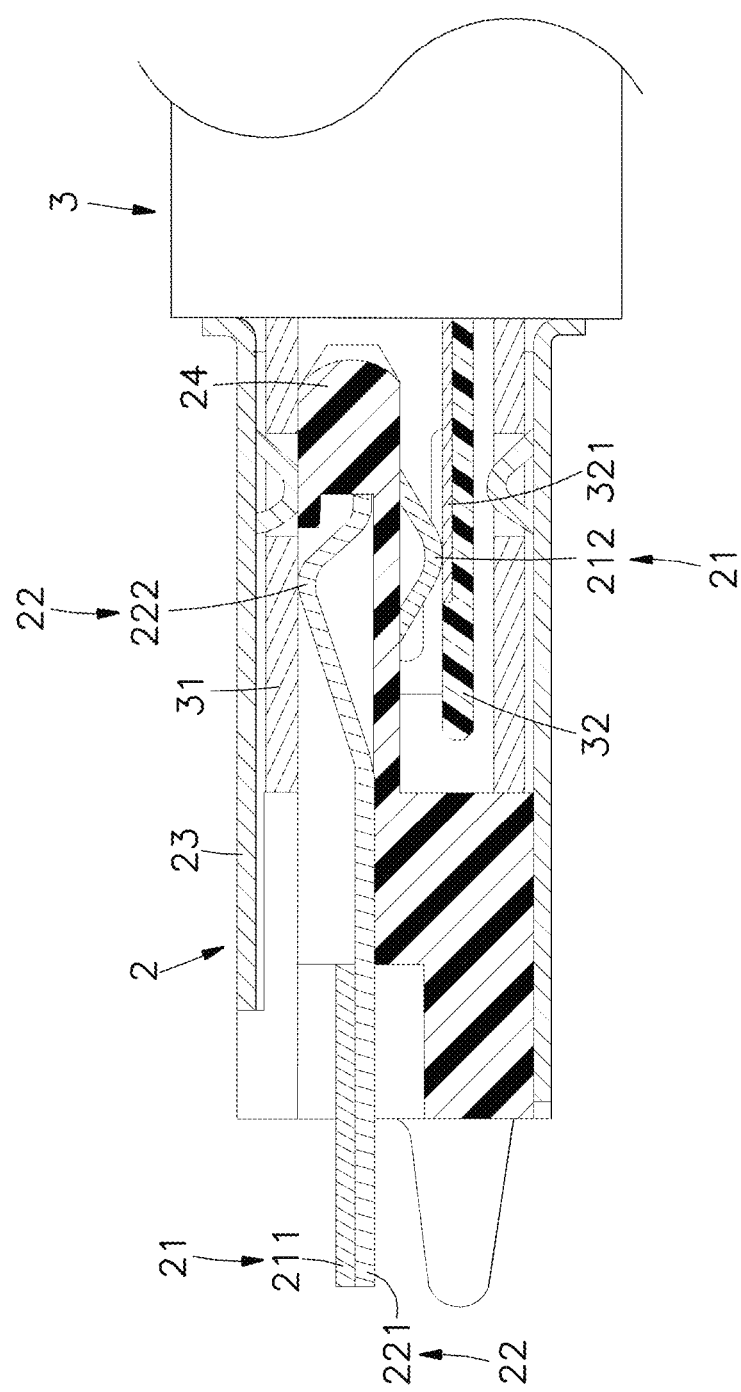
FIG. 4 is a schematic sectional side view, showing a USB male connector plugged in the USB female connector.

Referring to FIGS. 1-4, an oblique top elevational view of an electric sofa using a power supply system in accordance with the present invention, an elevational side view of the USB female connector of the power supply system, a sectional view of the USB female connector and a sectional side view showing the USB female connector connected with a male connector of an electronic device are shown. As illustrated, the power supply system is mounted in an electric sofa 1, comprising a USB female connector 2 provided for a USB male connector 3 to be plugged in for power supply transmission.

The USB female connector 2 is provided with four signal pins 21, a trigger signal pin 22, a frame 23 and a tongue plate 24. The signals transmitted by the four signal pins 21 are sequentially VCC (+5V), Data-, Data+, and GND, and the four signal pins 21 each have a soldering portion 211 at one end thereof and a curved mating connection portion 212 at an opposite end thereof. The mating connection portions 212 of the four signal pins 21 are disposed on a first surface of the tongue plate 24. The trigger signal pin 22 has a soldering portion 221 at one end thereof and a curved mating connection portion 222 at an opposite end thereof. The mating connection portion 222 of the trigger signal pin 22 is disposed on an opposite second surface of the tongue plate 24. The frame 23 surrounds the four signal pins 21, the trigger signal pin 22 and the tongue plate 24.

Figure 5:
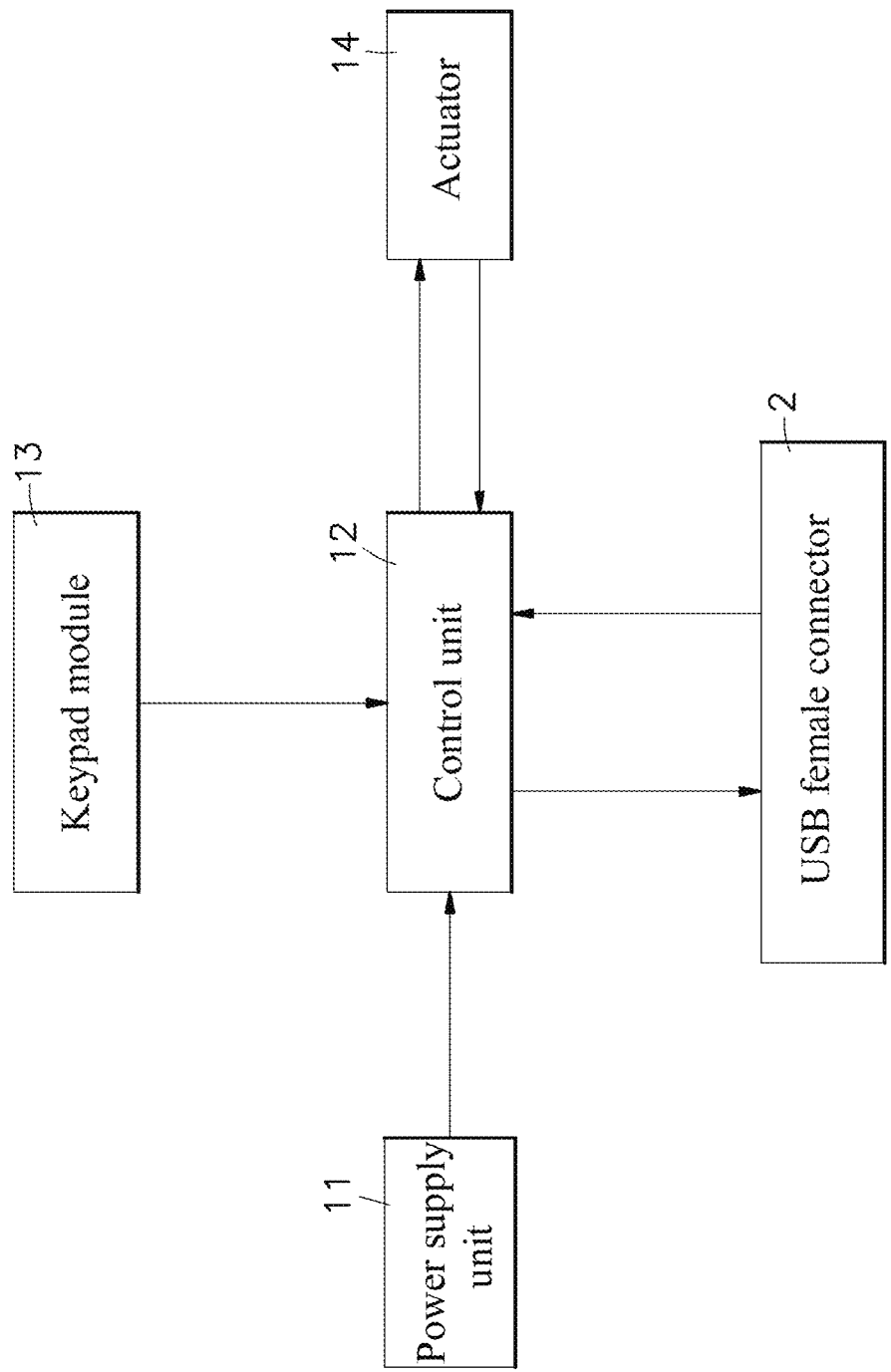
FIG. 5 is a circuit block diagram of the power supply system in accordance with the present invention.
Figure 6:
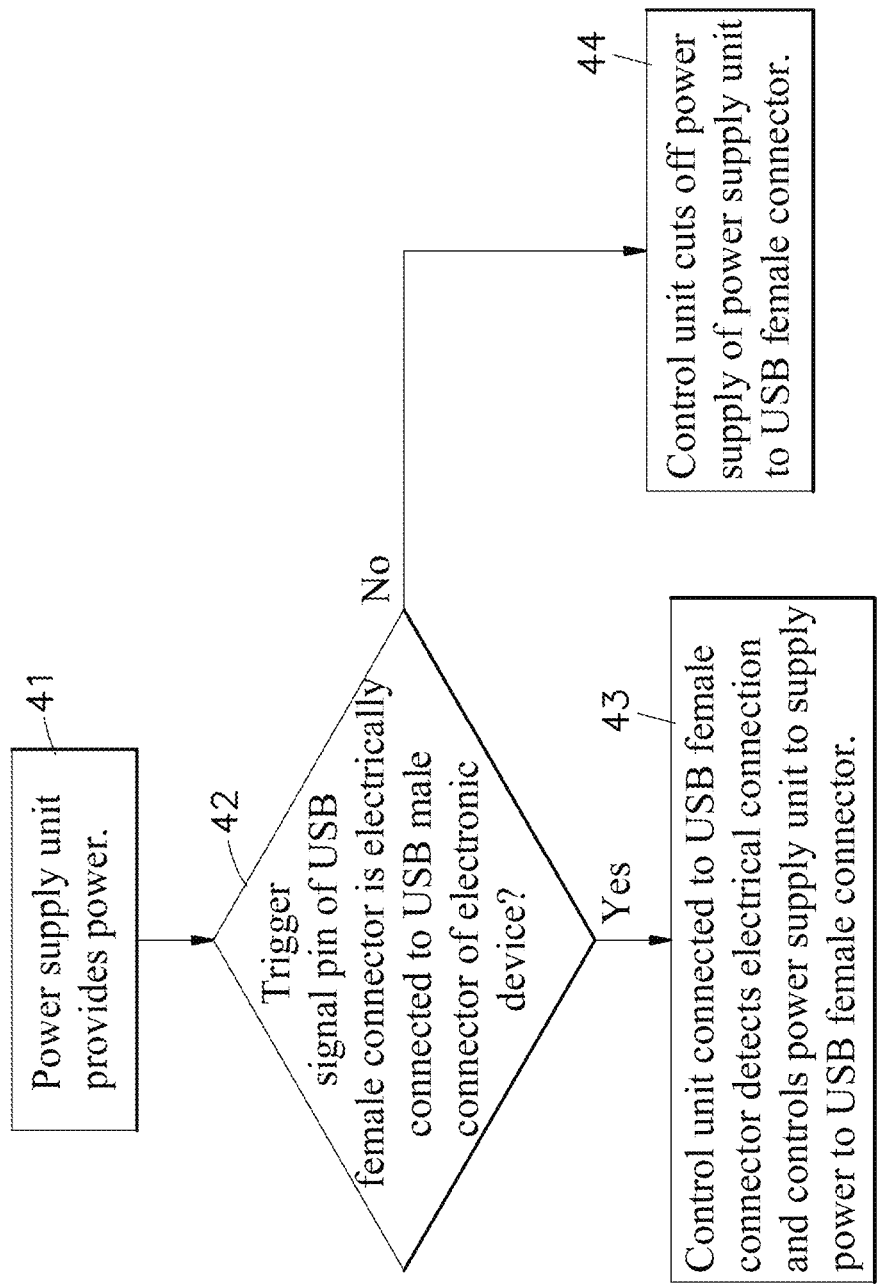
FIG. 6 is an operational flow chart of the present invention.

In particular, as shown in FIG. 4 again, when an external electronic device is connected to the USB female connector 2, a housing 31 of the USB male connector 3 is inserted into the frame 23 of the USB female connector 2, contacts 321 on a protruding plate 32 of the USB male connector 3 are electrically connected with the mating connection portions 212 of the signal pins 21 at the bottom side of the tongue plate 24 of the USB female connector 2, and the mating connection portion 222 of the trigger signal pin 22 at the top side of the tongue plate 24 is disposed inside the housing 31 of the USB male connector 3 and electrically connected with a control unit 12 (see FIG. 5). At this time, the control unit 12 that is electrically connected to the trigger signal pin 22 detects that the USB male connector 3 of the electronic device (for example, a smart phone, a tablet or a mobile power source) is inserted and electrically connected to the trigger signal pin 22, and then the control unit controls a power supply unit 11 (see FIG. 5) to provide power supply to the USB female connector 2. The trigger signal pin 22 forms a switch. When a mating USB male connector 3 of any electronic device is plugged into the USB female connector 2 and electrically connected to the trigger signal pin 22, the USB female connector 2 can supply power to the external electronic device. This arrangement uses relative intuition and plug-and-play functionality. When the USB male connector 3 of the electronic device is unplugged from the USB female connector 2, the control unit 12 does not detect the USB male connector 3 to make an electrical connection, that is, stops supplying power to the USB female connector 2, achieving USB female connector zero power consumption. With the foregoing structure, it can be improved the problem that the USB female connector of a conventional electric sofa still needs standby current or an additional switch to control the power supply.

Referring to FIG. 5, a circuit block diagram of the power supply system in accordance with the present invention is shown. The power supply system comprises a power supply unit 11, a USB female connector 2, a control unit 12, a keypad module 13 and an actuator 14. The power supply unit 11 is disposed in the electric sofa 1 for providing a power. The power supply unit 11 further includes a voltage adjustment unit for adjusting an AC voltage or a DC voltage to an appropriate voltage to provide power required by the USB female connector 2. Since the components of the power supply unit 11 are not the focus of the present invention, they are not described here. The USB female connector 2 is disposed on the surface of the electric sofa 1 for the connection of a mating USB male connector of an external electronic device, and the USB female connector 2 includes at least one trigger signal pin 22. The control unit 12 is disposed in the electric sofa 1 and electrically connected to the power supply unit 11 and the USB female connector 2. If the trigger signal pin 22 of the USB female connector 2 is electrically connected to a mating USB male connector of an external electronic device, the power supply unit 11 is controlled to supply power to the USB female connector 2. If the trigger signal pin of the USB female connector 2 is not electrically connected to the USB male connector of the electronic device, the power supply unit 11 is cut off to the USB female connector 2. The control unit 12 is electrically connected with the keypad module 13 and the actuator 14. The actuator 14 is adapted for adjusting the inclined angle of the electric sofa 1. The keypad module 13 controls the actuator 14 through the control unit 12.

The operation of the electric sofa power supply system includes the steps as outlined hereinafter:

Step 41: The power supply unit provides power.

Step 42: Whether the trigger signal pin of the USB female connector is electrically connected to the USB male connector of the electronic device. If yes, go to step 43; if no, go to step 44.

Step 43: The control unit connected to the USB female connector detects the electrical connection and controls the power supply unit to supply power to the USB female connector.

Step 44: The control unit cuts off the power supply of the power supply unit to the USB female connector.

By the disclosure of FIGS. 1-6 above, it can be understood that the present invention provides an electric sofa power supply system, which includes a power supply unit, a USB female connector having a trigger signal, and a control unit electrically connected with the power supply unit and the USB female connector. When the trigger signal pin of the USB female connector is electrically connected with a mating USB male connector of an external electric device, the control unit controls the power supply unit to provide power to the USB female connector. When the USB female connector is electrically disconnected from the mating USB male connector of the external electric device, the control unit cuts off the power supply of the power supply unit to the USB female connector, achieving zero power consumption, energy saving and environmental protection, and enhancing the safety of using the power supply system. The use of the electric sofa power supply system does not need to add a switch to the electric sofa to control the power supply of the USB female connector, which greatly increases the aesthetics and practicability. The present invention has great practicality in the commercial market of electric sofas or electric massage chairs and enhances the added value of products. Therefore, a patent application is filed to seek patent protection.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electric sofa power supply system used in an electric sofa, comprising:
   a power supply unit disposed in said electric sofa to provide a power supply;
   a USB female connector disposed on a surface of said electric sofa for the connection of a mating USB male connector of an external electronic device, said USB female connector comprising a trigger signal pin, said trigger signal pin comprising a curved mating connection portion; and a control unit disposed in said electric sofa and electrically connected with said power supply unit and said USB female connector;

wherein when said trigger signal pin of said USB female connector is electrically connected with a mating USB male connector of an external electric device, said control unit controls said power supply unit to provide a power supply; when said USB female connector is electrically disconnected from said mating USB male connector of said external electric device, said control unit cuts off said power supply of said power supply unit to said USB female connector.

2. The electric sofa power supply system as claimed in claim 1, wherein when said curved mating connection portion of said trigger signal pin of said USB female connector is electrically connected to an inner side in a housing of said USB male connector of said external electronic device, said control unit detects that said USB male connector of said external electronic device is inserted and electrically connected to said trigger signal pin, and then controls said power supply unit to provide said power supply to said USB female connector.

3. The electric sofa power supply system as claimed in claim 1, wherein said USB female connector comprises four signal pins, said trigger signal pin, a frame and a tongue plate, said tongue plate defining a first surface and an opposing second surface, said signal pins each comprising a curved mating connection portion respectively disposed on said first surface of said tongue plate, said curved mating connection portion of said trigger signal pin being disposed on said second surface of said tongue plate, said frame surrounding said signal pins, said trigger signal pin and said tongue plate.

4. The electric sofa power supply system as claimed in claim 3, wherein the signals transmitted by said four signal pins are sequentially VCC (+5V), Data−, Data+, and GND; each said signal pin comprises a soldering portion at one end thereof and the respective said curved mating connection portion at an opposite end thereof; said trigger signal pin comprises a soldering portion at one end thereof and the said curved mating connection portion of said trigger signal pin at an opposite end thereof.

5. The electric sofa power supply system as claimed in claim 1, further comprising a keypad module and an actuator respectively electrically connected to said control unit, said actuator being configured to adjust the inclined angle of said electric sofa, said keypad module being configured to control said actuator through said control unit.

6. The electric sofa power supply system as claimed in claim 1, wherein said power supply unit comprises a voltage adjustment unit for adjusting an AC voltage or a DC voltage to a predetermined voltage required by said USB female connector.

* * * * *